(12) United States Patent
Melcher (10) Patent No.: US 10,065,695 B1
(45) Date of Patent: Sep. 4, 2018

(54) DEVICE FOR PASSIVE CONTROL OF STEERING MECHANISMS

(71) Applicant: Thomas Melcher, Granite Falls, WA (US)

(72) Inventor: Thomas Melcher, Granite Falls, WA (US)

(*) Notice: Subject to any disclaimer, the term of this patent is extended or adjusted under 35 U.S.C. 154(b) by 0 days.

(21) Appl. No.: 15/600,374

(22) Filed: May 19, 2017

(51) Int. Cl.
*B62H 3/04* (2006.01)
*B62K 21/10* (2006.01)
*B62K 25/04* (2006.01)
*B62K 3/08* (2006.01)
*B62H 5/06* (2006.01)

(52) U.S. Cl.
CPC ............... *B62H 3/04* (2013.01); *B62K 21/10* (2013.01); *B62H 5/06* (2013.01); *B62H 2700/005* (2013.01); *B62K 3/08* (2013.01); *B62K 2025/047* (2013.01)

(58) Field of Classification Search
CPC ...... B62H 3/04; B62H 5/06; B62H 2700/005; B62K 21/10; B62K 2025/047; B62K 3/08
See application file for complete search history.

(56) References Cited

U.S. PATENT DOCUMENTS

| | | | | |
|---|---|---|---|---|
| 1,230,801 A * | 6/1917 | Schriver | ................ | B62K 21/10 280/271 |
| 2,103,674 A * | 12/1937 | Jackson | ................... | B62H 5/06 280/272 |
| 2,496,478 A * | 2/1950 | Kinnebrew | ........... | A61J 9/0638 248/103 |
| 2,950,836 A * | 8/1960 | Murdock | ............ | A24F 19/0092 131/241 |
| 3,990,716 A * | 11/1976 | Dows | ..................... | B62K 21/10 280/271 |
| 4,006,915 A * | 2/1977 | Parker | .................... | B62K 21/10 280/271 |
| 4,735,388 A * | 4/1988 | Marks | ................... | A61J 9/0638 248/103 |
| 5,112,071 A * | 5/1992 | Jones | ....................... | B62J 15/00 280/152.3 |
| 5,775,654 A * | 7/1998 | Price | .................. | A47G 23/0225 248/103 |
| 7,036,778 B2 * | 5/2006 | Ferrell | ................. | A47G 19/025 248/213.2 |
| 8,469,325 B2 * | 6/2013 | Yu | .......................... | G10G 5/005 248/231.51 |

(Continued)

*Primary Examiner* — Ko Hung Chan
(74) *Attorney, Agent, or Firm* — Michelle E. Carey; Telekta Law, P.S.

(57) ABSTRACT

A device for preventing the front wheel of a bicycle from turning, comprising a clamp, a lever, and a receiver. The clamp is configured to be removably coupled with the steer tube of a bicycle, and is adjustable. The adjustable clamp is configured to be secured tightly around the steer tube to prevent rotation of the front wheel of the bicycle and to prevent rotation of the clamp around the steer tube. The lever is coupled with the clamp and is rotatable from vertical, through horizontal, to the proper angle to meet the receiver, which is disposed on a cross bar or down tube of a bicycle. The lever includes a knob and the receiver is configured to receive and slightly contract around the knob, temporarily coupling the steer tube and the cross bar or down tube, locking the wheel in its position when the lever is engaged.

16 Claims, 7 Drawing Sheets

(56) References Cited

U.S. PATENT DOCUMENTS

| | | | |
|---|---|---|---|
| 8,684,385 B2 * | 4/2014 | Kuboyama | B62K 21/08 280/271 |
| 2005/0151040 A1 * | 7/2005 | Hsu | B62J 11/00 248/214 |

* cited by examiner

DEVICE FOR PASSIVE CONTROL OF STEERING MECHANISMS

FIELD OF THE INVENTION

This invention relates generally to bicycles, and more specifically to passive control of steering mechanisms.

BACKGROUND OF THE INVENTION

Bicycles are inherently unstable when parked, especially touring bikes loaded with extra equipment and supplies. When parked, bicycles have a tendency to roll, or the wheel has a tendency to turn, and the bike falls over. The present invention aims to remedy the problem by holding the front wheel straight, preventing the wheel from turning and helping to keep the bike upright. This is useful both when the bike is parked in a rack or against a support. The present invention can also be used when the bicycle is being hand-driven by a dismounted user, because the front wheel held straight allows the user to better steer and support the bicycle without wobble.

SUMMARY OF THE INVENTION

This invention relates generally to bicycles, and more specifically to passive control of steering mechanisms.

The invention is comprised essentially of a clamp, a lever, and a receiver. In some embodiments the clamp may serve to couple the lever with a steer tube of a bicycle. In some embodiments, the clamp and the receiver may each be contractible, allowing a user to secure them about multiple sizes of bicycles.

A device for preventing the front wheel of a bicycle from turning, comprising a clamp, a lever, and a receiver. The clamp is configured to be removably coupled with the steer tube of a bicycle, and is adjustable to fit many sizes of bikes. The adjustable clamp is configured to be secured tightly around the steer tube to prevent rotation of the front wheel of the bicycle and to prevent rotation of the clamp around the steer tube. The lever is coupled with the clamp and is rotatable from vertical, through horizontal, to the proper angle to meet the receiver, which is disposed on a cross bar or down tube of a bicycle. The lever includes a knob and the receiver is configured to receive and slightly contract around the knob, temporarily coupling the steer tube and the cross bar or down tube, locking the wheel in its position when the lever is engaged.

In some embodiments, the lever may be hingeably coupled with the clamp, such that the lever can be moved from vertical, through horizontal, and to the proper angle to couple with the receiver, which will, in preferred embodiments, be configured to be coupleable with a top tube, cross bar, or down tube of a bicycle. The hinge coupling the lever with the clamp may be freely rotating, or it may include one or more mechanisms for returning the lever to a substantially vertical position when the knob of the lever is released from the grip of the receiver. These mechanisms may include springs such as torsion springs, clock springs, or compression springs. One would understand that many methods of returning an object to a beginning position might be employed without altering the function of the invention.

In some embodiments, the knob of the lever may be substantially round, and it may be configured to fit snugly within the grip of the receiver. The grip of the receiver may be configured to close slightly around the knob after the knob is received, applying a compressive force to hold the knob in place. The grip may further include high friction materials to help hold the knob in place.

In some embodiments, the receiver portion may couple with a bicycle down tube, cross bar, or top tube via a strap. The strap may be substantially rigid and may include a contractible fastener to allow the strap to be snugly secured around the tube to prevent slipping. The inner perimeter of the strap may further include high friction material to prevent rotation and slipping of the receiver. In other embodiments, the strap may be substantially flexible, and may be configured to stretch around the tube, holding itself in place through friction and compressive force.

In some embodiments, the receiver portion may be a two-part clamshell style clamp, wherein coupling the receiver with a tube comprises disposing the upper portion about the upper portion of the tube and the lower portion about the lower portion of the tube, then coupling the upper portion and the lower portion using fasteners disposed on one or both sides of the receiver.

In other embodiments, the receiver portion may be configured to be coupled to the tube with a bolt and nut fastener, wherein the nut may be permanently disposed on the bicycle tube and wherein the receiver may be configured to sit over the nut. The receiver may be further configured to receive the bolt through the top of the receiver, the bolt then being coupled with the nut and securing the receiver to the tube.

In addition to the foregoing, various other methods, systems and/or program product embodiments are set forth and described in the teachings such as the text (e.g., claims, drawings and/or the detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, embodiments, features and advantages of the device and/or processes and/or other subject matter described herein will become apparent in the teachings set forth herein.

BRIEF DESCRIPTION OF THE DRAWINGS

Certain embodiments of the present invention are described in detail below with reference to the following drawings.

DETAILED DESCRIPTION

This invention relates generally to bicycles, and more specifically to passive control of steering mechanisms.

Specific details of certain embodiments of the invention are set forth in the following description and in FIGS. 1-7 to provide a thorough understanding of such embodiments. The present invention may have additional embodiments, may be practiced without one or more of the details described for any particular described embodiment, or may have any detail described for one particular embodiment practiced with any other detail described for another embodiment.

Importantly, a grouping of inventive aspects in any particular "embodiment" within this detailed description, and/or a grouping of limitations in the claims presented herein, is not intended to be a limiting disclosure of those particular aspects and/or limitations to that particular embodiment and/or claim. The inventive entity presenting this disclosure fully intends that any disclosed aspect of any embodiment in the detailed description and/or any claim limitation ever presented relative to the instant disclosure and/or any continuing application claiming priority from the instant application (e.g. continuation, continuation-in-part, and/or divisional applications) may be practiced with any other disclosed aspect of any embodiment in the detailed description and/or any claim limitation. Claimed combinations which draw from different embodiments and/or originally-presented claims are fully within the possession of the inventive entity at the time the instant disclosure is being filed. Any future claim comprising any combination of limitations, each such limitation being herein disclosed and therefore having support in the original claims or in the specification as originally filed (or that of any continuing application claiming priority from the instant application), is possessed by the inventive entity at present irrespective of whether such combination is described in the instant specification because all such combinations are viewed by the inventive entity as currently operable without undue experimentation given the disclosure herein and therefore that any such future claim would not represent new matter.

Figure 1:
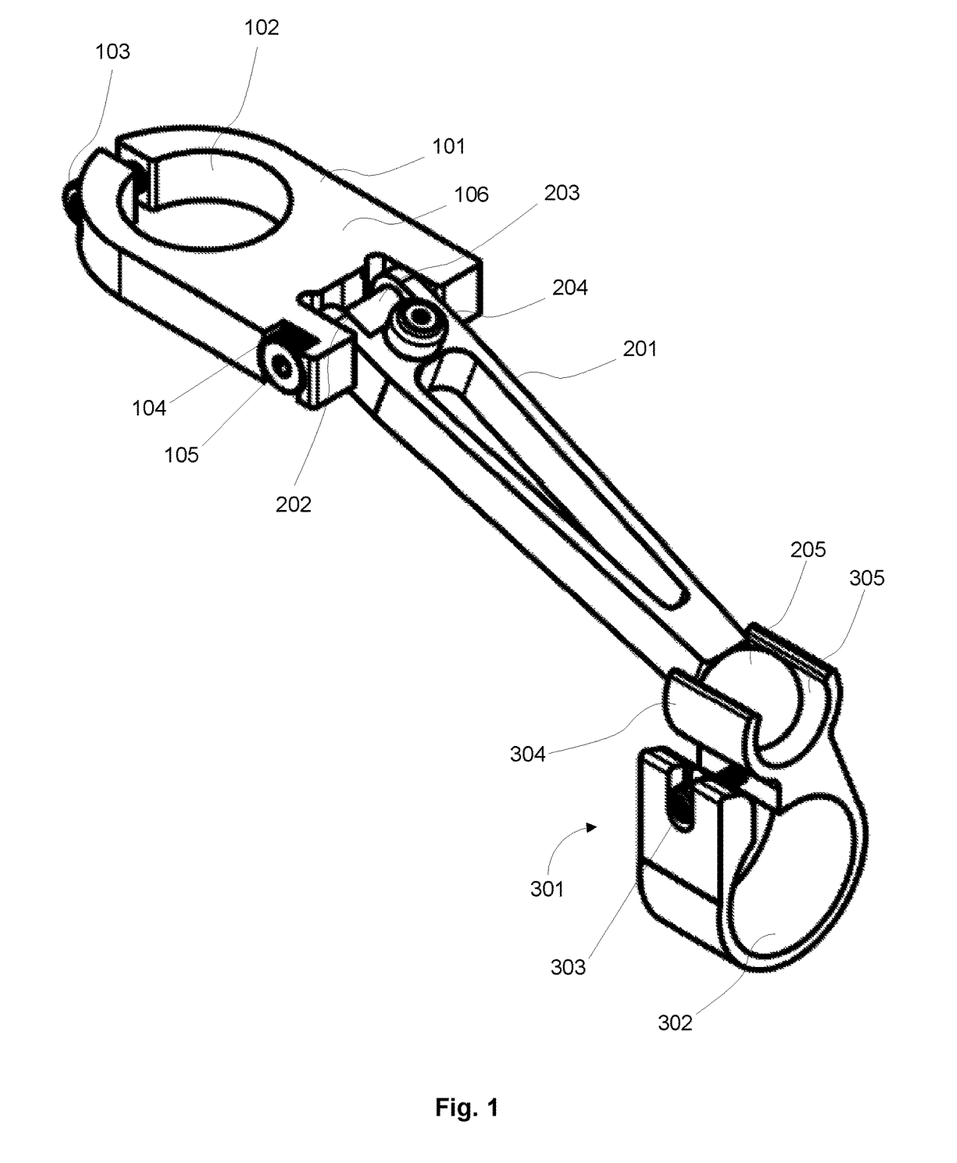
FIG. 1 is an isometric view of one embodiment of the STEER STOPPER in an engaged configuration.

FIG. 1 is an environmental view of one embodiment of the steer stopper in the engaged position. The steer stopper is comprised essentially of a steer tube clamp 101, a lever 201, and a receiver 301. In some embodiments, the steer tube clamp 101 is disposed around the steer tube or stem of a bicycle, which is placed within the perimeter of receiver portion 102 by sliding the clamp over the steer tube, or, in gooseneck style bicycles, up from the bottom of the tube after removal of the gooseneck. In some embodiments, the clamp 101 may be disposed around the gooseneck without having to remove the gooseneck, via a gap in the back of the clamp. Receiver portion 102 is then closed tightly around the steer tube of the bicycle via fastener 103. In some embodiments, fastener 103 may be a permanent fastener, such as a rivet or a permanent adhesive. In other embodiments, fastener 103 may be a removable fastener, such as a screw or a nut-and-bolt configuration. In preferred embodiments, fastener 103 may be a pinch bolt, configured to securely hold the clamp 101 on the steer tube while preventing rotation of the clamp about the steer tube.

Steer tube clamp 101 couples with lever 201 at the end of the clamp distal to the gap and fastener 103. The clamp 101 may include a spacer area 106 that allows the lever 201 to sit farther from the receiver portion 102, giving the lever a longer horizontal reach profile. In alternative embodiments, the lever 201 may be longer and may couple with the receiver portion 102 without a spacer area 106 or with a substantially smaller spacer area. A rod, such as a bolt, or a plastic or metal rod, 105 may be disposed through clamp apertures 104 and lever apertures 202. This provides a hinge type movement for lever 201 around rod 105, allowing the lever to move from vertical through horizontal into the receiver 301, and back. In some embodiments, lever 201 may include a torsion spring 203 disposed near or around the rod 105, the torsion spring configured to bring the lever back into a vertical position when it is released from receiver 301. Lever 201 may further include a stopper 204, placed near the coupling with clamp 101, configured to slow the impact of the lever against the clamp and prevent damage to the clamp, the lever, the bike, or a user, as well as limiting or eliminating vibrations between the clamp and the lever. Stopper 204 may further be configured to provide a frictional contact between the surface of the clamp 101 and the lever 201, which may help prevent the lever from moving downward while the steer stopper is disengaged. As such, the stopper 204 may be comprised of substantially softer, more flexible materials with a high coefficient of friction, such as rubber or silicon.

In some embodiments, lever 201 may be a substantially solid length of plastic or metal, and may include knob 205 at the end distal to the clamp 101. In other embodiments, lever 201 may be substantially hollow, as depicted in FIG. 1, to save on weight, which can be crucial for high performance cyclists. It should be understood that whether the lever 201 is hollow or solid will not alter the function of the steer stopper.

Knob 205 is configured to be received by receiver 301 when the lever 201 is moved from the vertical disengaged position to the engaged position, which may be at or lower than horizontal. Knob 205 may be removably coupled with lever 201, such that the knob can be replaced if damaged or worn. In other embodiments, knob 205 and lever 201 may be formed as a single unit, preventing the knob from unintentionally coming loose and compromising the performance of the steer stopper. In some embodiments, knob 205 may be comprised of the same material as lever 201. In other embodiments, knob 205 may be comprised of a different material, such as a material with a higher grip coefficient, or it may include a coating or layer of a high friction material, which would be beneficial in keeping it in the engaged position by increasing the grip between the knob and receiver 301.

In some embodiments, receiver 301 may be configured to receive knob 205 within the snap portion 304. Snap portion 304 may include an inner perimeter 305, configured to allow the knob 205 to snap into the snap portion 304 and exerting a grip force through at least one of compression, wherein the perimeter 305 is substantially the same size as or slightly smaller than the knob 205 when disengaged, or friction, wherein the perimeter is coated with a high friction material such as rubber or silicon, or both. In preferred embodiments, snap portion 304 may be substantially rigid, but flexible enough to allow knob 205 to be received and removed from the snap, while still holding the knob firmly in place.

In some embodiments, snap portion 304 is coupled with a strap portion 302. Strap portion 302 may be configured to be disposed around one of the top tube, also known as a cross bar, or the down tube of a bicycle. In other embodiments, strap 302 may be substantially flexible, comprised of a material such as rubber or silicone, and configured to conform to the circumference of the bicycle tube. This allows the steer stopper to be used with many sizes and even alternative shapes of bicycle tubes. In some embodiments, strap 302 may be substantially rigid, configured to fit snugly against a particular size tube, and comprised of a substantially hard or rigid material such as metal or plastic, particularly ABS plastic. In further embodiments, the inner perimeter of strap 302 may include a high friction material, such as rubber or silicone, to prevent the strap from rotating around the bicycle tube. The strap 302 may be then held firmly in place with a fastener 303. Fastener 303 may be comprised of many types of fasteners, and in preferred embodiments it may be a screw and lock nut, which provides a secure fastening of receiver 301 around the tube and helps to prevent rotation of the receiver.

Figure 2:
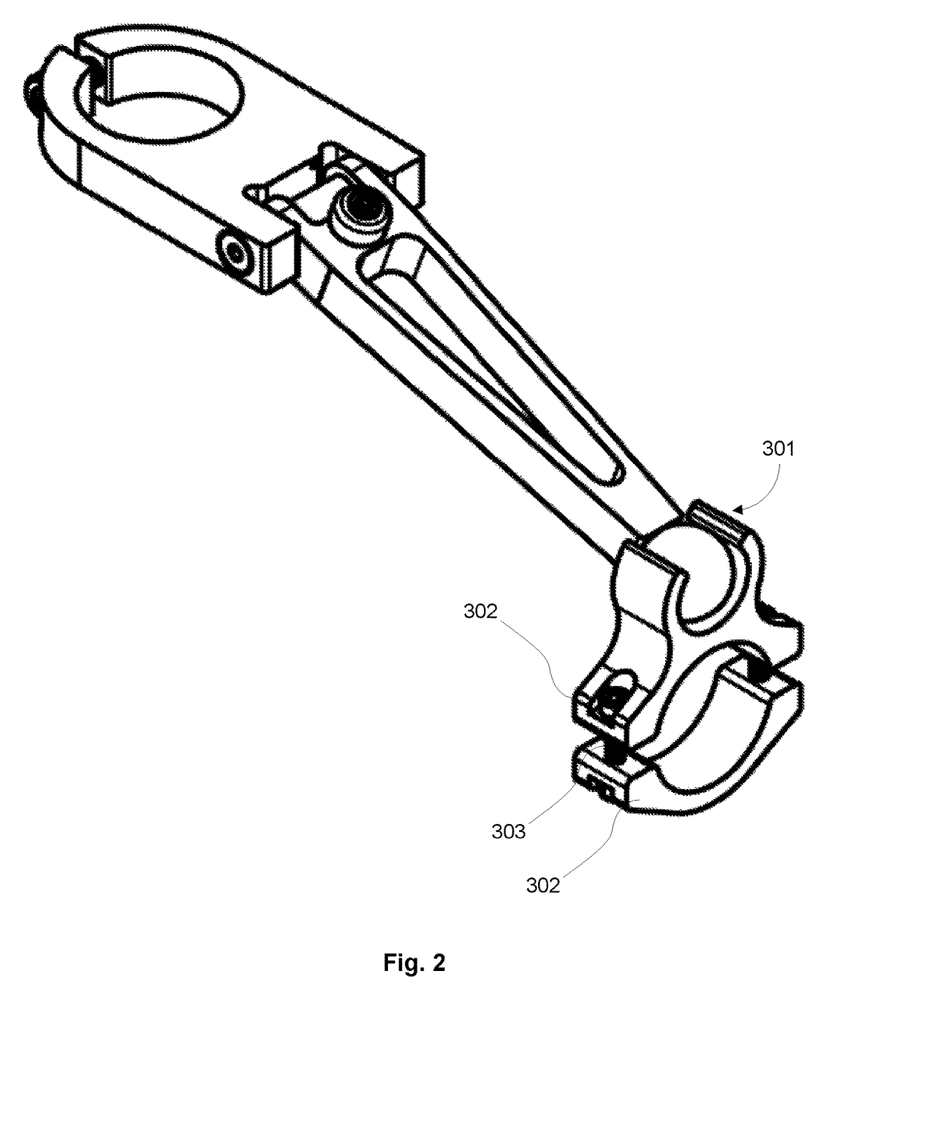
FIG. 2 is an isometric view of a different embodiment of the STEER STOPPER in an engaged configuration.

FIG. 2 is an environmental view of an alternative embodiment of the steer stopper in the engaged position. In this embodiment, strap portion 302 is comprised of an upper portion and a lower portion, and it is configured to be disposed around one of the top tube, also known as a cross bar, or the down tube of a bicycle. In the preferred embodiment, strap 302 in this configuration is comprised of a rigid upper and lower portion, which are then coupled with fasteners 303 to form the entirety of strap 302. In this embodiment, fasteners 303 include one fastener disposed on each side of the tube. To install, a user places the upper portion and the lower portion of the strap portion 302 on the upper and lower sides of the tube, respectively, and uses fasteners 303 to tighten the upper and lower portions about the tube. Fastener 303 may be comprised of many types of fasteners, and in preferred embodiments it may be a screw and lock nut, which provides a secure fastening of receiver 301 around the tube and helps to prevent rotation of the receiver. As in the FIG. 1 embodiment, a rigid version of strap portion 302 may include a high friction material on the inner perimeter to aid in preventing rotation of the strap portion. In other embodiments, the half-moon version of strap 302 may be substantially flexible, wherein one or both of the upper and lower portions are substantially flexible. In this embodiment, the apertures through which fasteners 303 are disposed may be substantially rigid portions permanently coupled with the substantially flexible portions, allowing the fasteners to be held in proper position relative to the remainder of the strap. Installation would be substantially the same as with a rigid embodiment, wherein the straps are disposed around the bicycle tube and coupled via the fasteners.

Figure 3A:
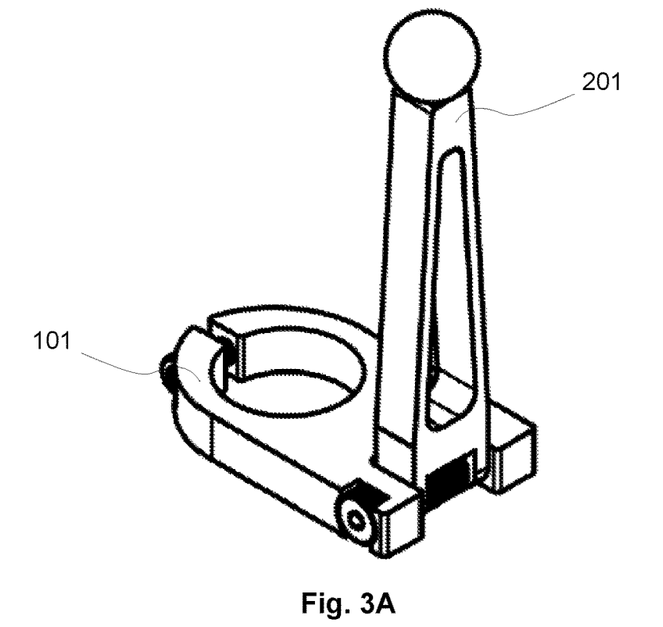
FIG. 3A is an isometric view of the STEER STOPPER lever in a disengaged position.
Figure 3B:
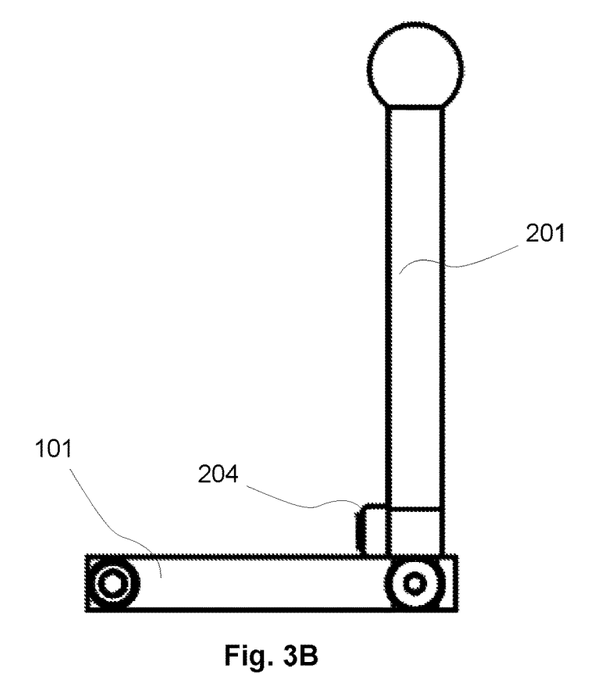
FIG. 3B is a side view thereof.

FIG. 3A is an isometric view of the clamp 101 and lever 201 in the vertical, disengaged position. This is the position a user would place the steer stopper in prior to riding the bicycle. FIG. 3B is a side view of the same configuration, showing that stopper 204 is in contact with both the lever 201 and the clamp 301.

Figure 4A:
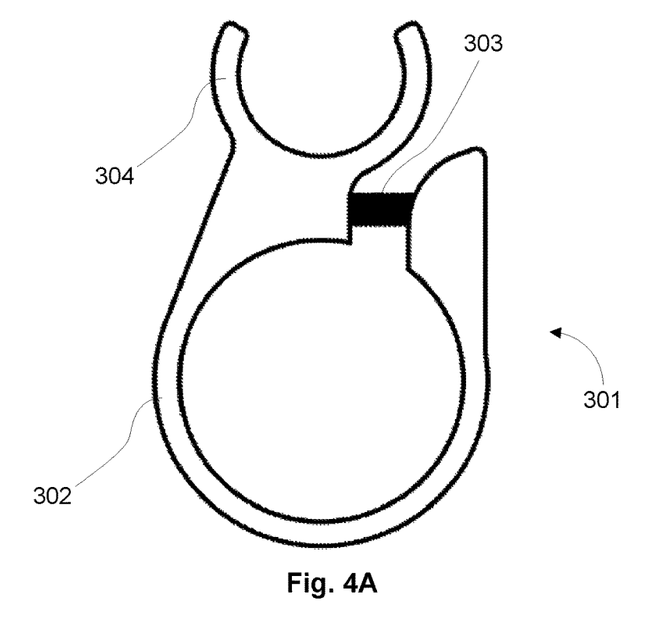
FIG. 4A is a front view of one embodiment of the STEER STOPPER receiver.
Figure 4B:
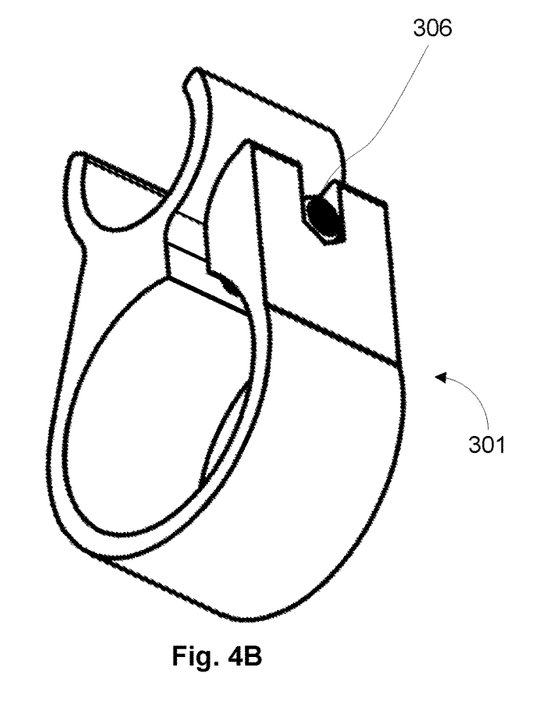
FIG. 4B is an isometric view thereof.

FIG. 4A is a front view of one embodiment of the receiver 301. Here it can be seen that fastener 303 is disposed through an aperture in the receiver 301 and in the snap portion 304. FIG. 4B shows that a screw head or a locknut 306 may be coupled with or an integrated part of the fastener 303, allowing a user to tighten or loosen the strap 302 around the bicycle tube.

Figure 5A:
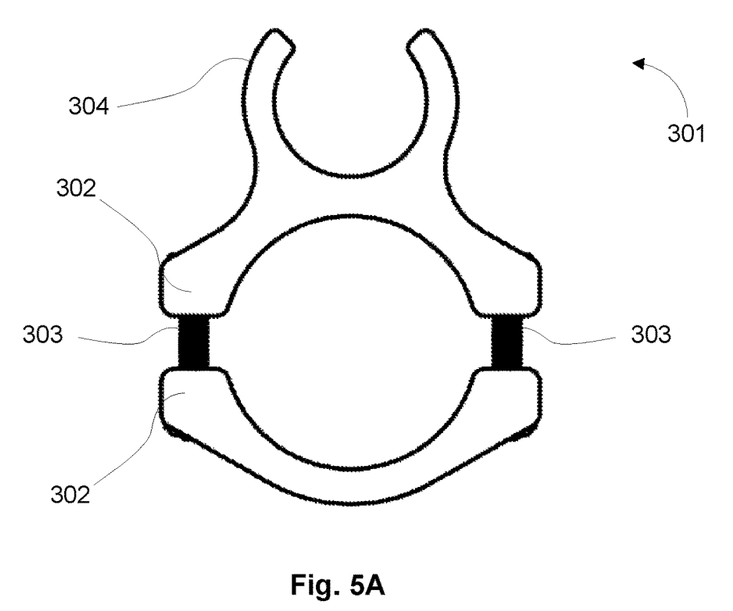
FIG. 5A is a front view of a different embodiment of the STEER STOPPER receiver.
Figure 5B:
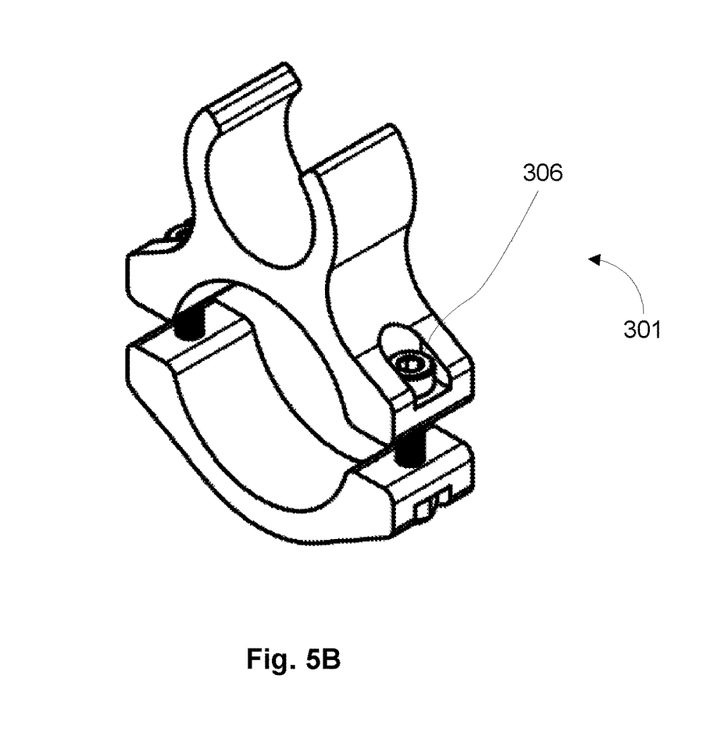
FIG. 5B is an isometric view thereof.

FIG. 5A is a front view of an alternative embodiment of the receiver 301. Here it can be seen that fasteners 303 are disposed through apertures in the receiver 301, removably coupling the upper and lower portions of strap 302. FIG. 5B shows that screw heads or locknuts 306 may be coupled with or an integrated part of the fasteners 303, allowing a user to tighten or loosen the strap 302 around the bicycle tube.

Figure 6A:
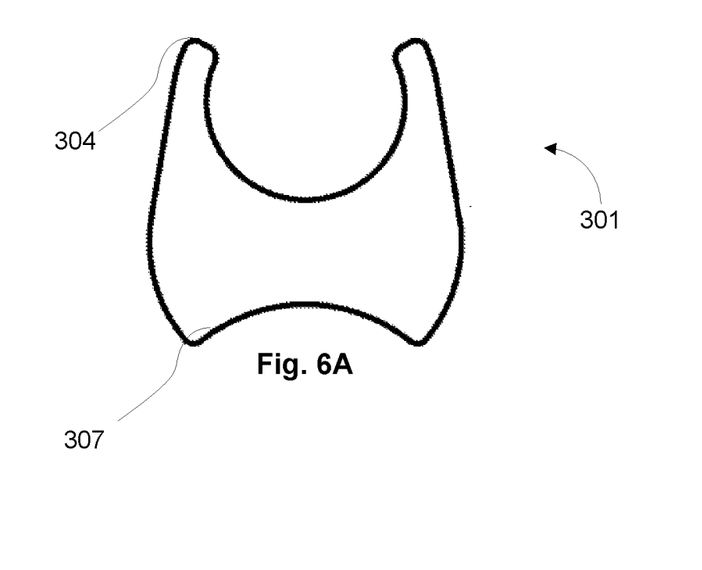
FIG. 6A is a front view of a different embodiment of the STEER STOPPER receiver.
Figure 6B:
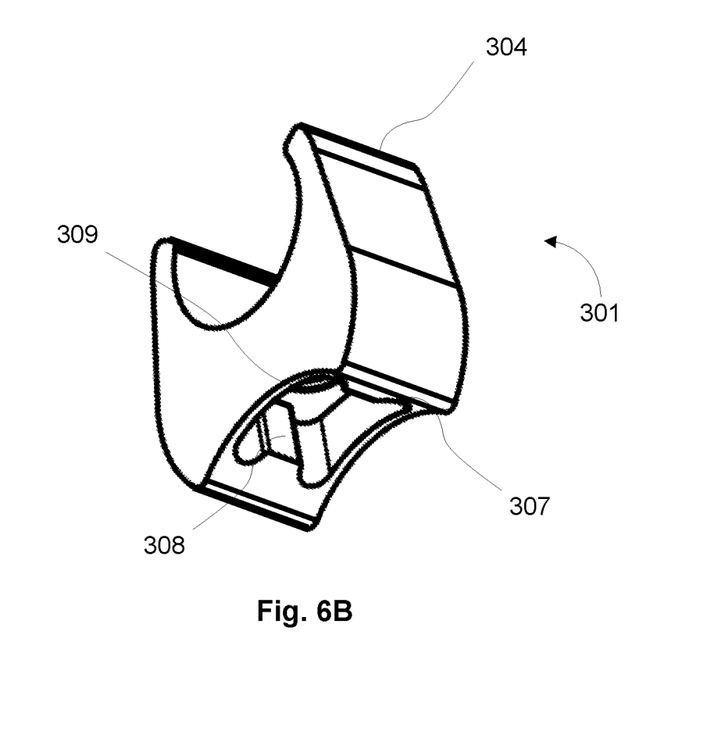
FIG. 6B is an isometric view thereof.

FIG. 6A is a front view of an alternative embodiment of the receiver 301. In this embodiment, receiver 301 is configured to be coupled with the top tube or down tube of the bicycle, via a braze, a weld, or a strong adhesive. More specifically, in this embodiment, a fastener, such as a nut, is permanently coupled with the tube of the bicycle, and the receiver is configured to receive the nut and be removably coupled with a screw. While a nut and screw are particularly disclosed, it should be understood that other two-part couplers may be used in a similar manner, with one part permanently coupled with the tube and configured to receive the other part which will attach the receiver 301. In this embodiment, receiver 301 includes a curved or square bottom 307 that allows the receiver to approximate the shape of the top tube or down tube. FIG. 6B shows detail on the bottom 307, showing that, in a curved embodiment, the shape of the receiver should approximate the shape of the tube. FIG. 6B also shows nut gap 308, configured to slip over and receive the nut permanently coupled with the tube, and screw hole 309 configured to receive a screw and couple with the nut, coupling the receiver 301 with the bicycle tube.

Figure 7:
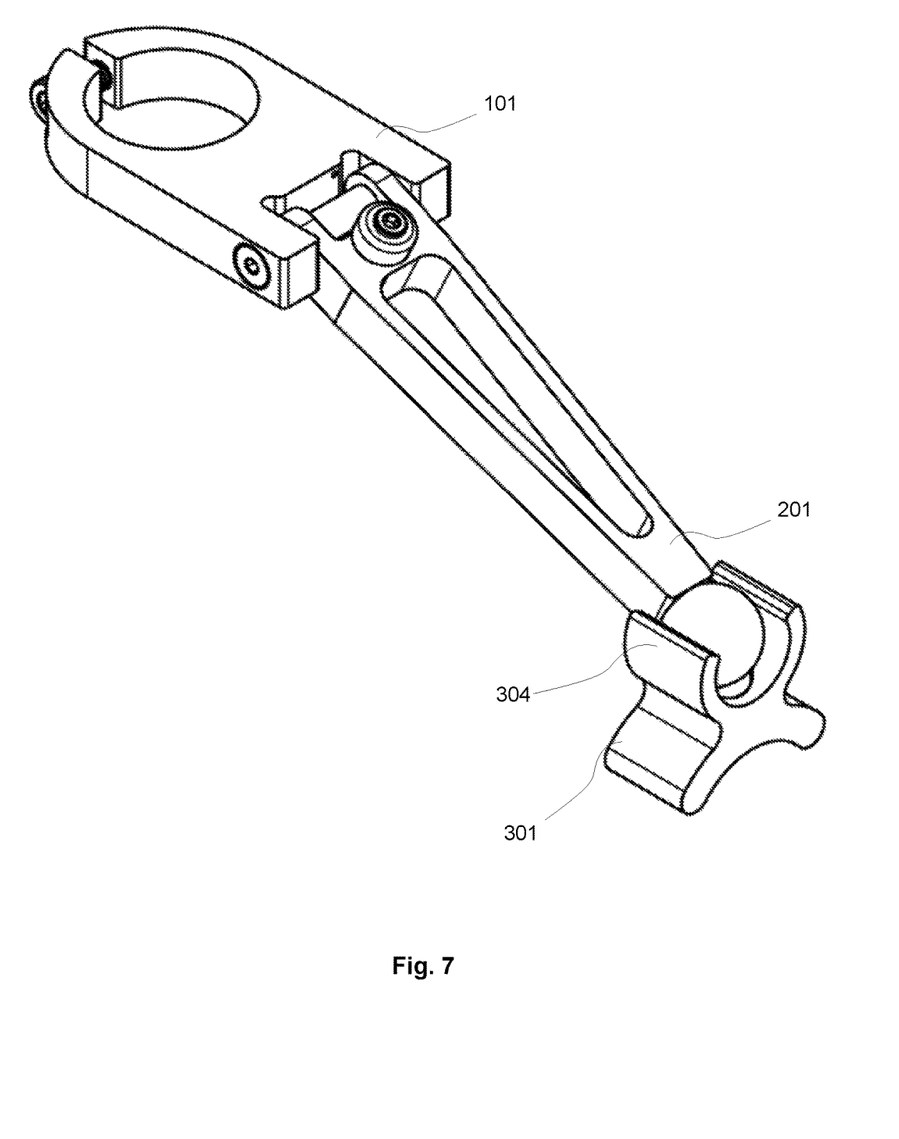
FIG. 7 is an isometric view of a different embodiment of the STEER STOPPER in an engaged configuration.

FIG. 7 an isometric view of the embodiment of the STEER STOPPER shown in FIGS. 6A and 6B, in an engaged configuration. In this embodiment, the clamp and lever are substantially the same as, or even identical to, the other embodiments, and the receiver 301 still includes snap portion 304, but the mechanism for attaching the receiver to the bicycle is as disclosed in FIGS. 6A and 6B.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

While preferred and alternative embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A device, comprising:
   an adjustable clamp;
   at least one lever coupled with the clamp, the at least one lever including a knob portion at an end distal to the adjustable clamp; and
   a receiver, the receiver including at least:
      a grip configured to receive the knob portion of the at least one lever;
      an aperture configured to receive a first portion of a fastener, the first portion of the fastener being a bolt; and
      a recess configured to receive a second portion of the fastener, the second portion of the fastener being a nut configured to be permanently coupled with at least one of a bicycle down tube, cross bar, or top tube, wherein coupling the first portion of the fastener and the second portion of the fastener secures to the receiver to at least one of the bicycle down tube, cross bar, or top tube.

2. The device of claim 1, wherein the adjustable clamp comprises:
   a receiver portion configured to be disposed around at least one of a tube or a rod, the receiver portion including at least one gap, the at least one gap including at least one mechanism for closing the gap.

3. The device of claim 2, wherein the at least one mechanism for closing the gap is at least one of a thumb screw, a nut-and-screw fastener, or a pinch bolt.

4. The device of claim 2, wherein the adjustable clamp comprises:
   at least one spacer area disposed between the receiver portion and the at least one lever.

5. The device of claim 1, wherein the at least one lever coupled with the clamp comprises:
   the at least one lever hingeably coupled with the at least one clamp.

6. The device of claim 5, wherein the at least one lever hingeably coupled with the at least one clamp further comprises:
   at least one torsion spring disposed between the at least one lever and the at least one clamp.

7. The device of claim 5, wherein the at least one lever hingeably coupled with the at least one clamp further comprises:
   at least one spring disposed between the at least one lever and the at least one clamp such that the at least one lever returns to a vertical position when the at least one spring is released.

8. The device of claim 1, wherein the at least one lever coupled with the clamp, the knob portion of the at least one lever including at least one substantially round knob coupled with the end of the lever distal to the adjustable clamp.

9. The device of claim 8, wherein the substantially round knob is permanently coupled with the at least one lever.

10. The device of claim 8, wherein the substantially round knob is removably coupled with the at least one lever.

11. The device of claim 1, wherein the at least one lever coupled with the clamp, the knob portion of the at least one lever including at least one substantially spherical knob coupled with the end of the lever distal to the adjustable clamp.

12. The device of claim 1, wherein the receiver includes a bottom surface that is curved to approximate the shape of at least one of the bicycle top tube, cross bar, or down tube.

13. The device of claim 1, wherein the receiver grip is configured to removably receive the knob portion of the at least one lever.

14. The device of claim 13, wherein the receiver grip is configured to compress around the knob portion of the at least one lever after receiving the knob portion.

15. The device of claim 1, wherein the receiver aperture is configured to be secured by the bolt.

16. A device, comprising:
   an adjustable clamp including at least one mechanism for contracting the at least one clamp;
   at least one lever coupled with the clamp, the at least one lever including a knob portion at an end distal to the adjustable clamp; and
   a receiver, the receiver including at least:
      a grip configured to receive the knob portion of the at least one lever;
      an aperture configured to receive a bolt; and
      a recess configured to receive a nut, the nut configured to be permanently coupled with at least one of a bicycle down tube, cross bar, or top tube, wherein coupling the bolt and the nut secures to the receiver to at least one of the bicycle down tube, cross bar, or top tube.

* * * * *